United States Patent
Mehta et al.

[11] Patent Number: 6,157,634
[45] Date of Patent: Dec. 5, 2000

[54] DYNAMIC INTERCHANGEABILITY OF VOICE AND DATA CHANNELS AND FACILITIES IN SWITCHED MODE NODAL NETWORKS

[75] Inventors: Prafull M. Mehta, Manalapan; Chintalapati S. Sastry, Belle Mead, both of N.J.

[73] Assignee: AT&T Corp., New York, N.Y.

[21] Appl. No.: 09/034,816

[22] Filed: Mar. 4, 1998

[51] Int. Cl.[7] .................................................. H04L 12/28
[52] U.S. Cl. ........................ 370/351; 370/360; 370/377; 370/522
[58] Field of Search ..................... 370/351–352, 370/357, 360, 363, 368, 377–384, 522, 524, 410; 379/93.01, 204

[56] References Cited

U.S. PATENT DOCUMENTS

| | | | |
|---|---|---|---|
| 4,577,065 | 3/1986 | Frey et al. | 379/204 |
| 5,187,710 | 2/1993 | Chau et al. | 370/524 |
| 5,327,484 | 7/1994 | Connell et al. | 379/93.01 |
| 5,473,679 | 12/1995 | La Porta et al. | 370/410 |
| 5,661,725 | 8/1997 | Buck et al. | 370/377 |
| 5,870,383 | 2/1999 | Eslambolchi et al. | 370/522 |
| 5,987,027 | 11/1999 | Park et al. | 370/360 |

*Primary Examiner*—Chi H. Pham
*Assistant Examiner*—Maikhanh Tran

[57] ABSTRACT

A method and a system for controlling a dynamic channel reconfiguration of an access facility in which a first bit stream is connected on a first channel to a second channel. A status associated with the first bit stream is queried. In response to the query, status information, which includes a configuration map status, is received for the first bit stream. The configuration map status for the first bit stream is then stored in a first memory area. A command is received for disconnecting the first bit stream on the first channel from the second channel, and the first channel is disconnected from the second channel. A set of parameters associated with the first channel are then groomed to match a set of parameters associated with the third channel. A command is received for connecting a second bit stream on the first channel to a third channel. A configuration status for the second bit stream is stored in a second memory area. The first channel is then connected to the third channel, and the second bit stream on the first channel is directed to the third channel. The dynamic channel reconfiguration implementation is restored by disconnecting the first channel from the third channel, regrooming the parameters associated with the first channel, storing retrieved configuration map status for the first bit stream in the second memory area, connecting the first channel to the second channel, and directing the first bit stream on the first channel to the second channel.

37 Claims, 16 Drawing Sheets

FIG. 3B

| FROM | X00 | X01 | X02 | X03 | X04 | ... | X20 | X21 | X22 | X23 |
|------|-----|-----|-----|-----|-----|-----|-----|-----|-----|-----|
| TO   | Z00 | Y01 | Y02 | Z03 | Z04 | ... | Y20 | Z21 | Z22 | Y23 |

MAP 115

FIG. 3C

| D00 | V01 | V02 | D03 | D04 | ... | V20 | D21 | D22 | V23 |

T1 FRAME X'

FIG. 3D

|  | V01 | V02 |  |  | ... | V20 |  |  | V23 |

T1 FRAME Y'

FIG. 3E

| D00 |  |  | D03 | D04 | ... |  | D21 | D22 |  |

T1 FRAME Z'

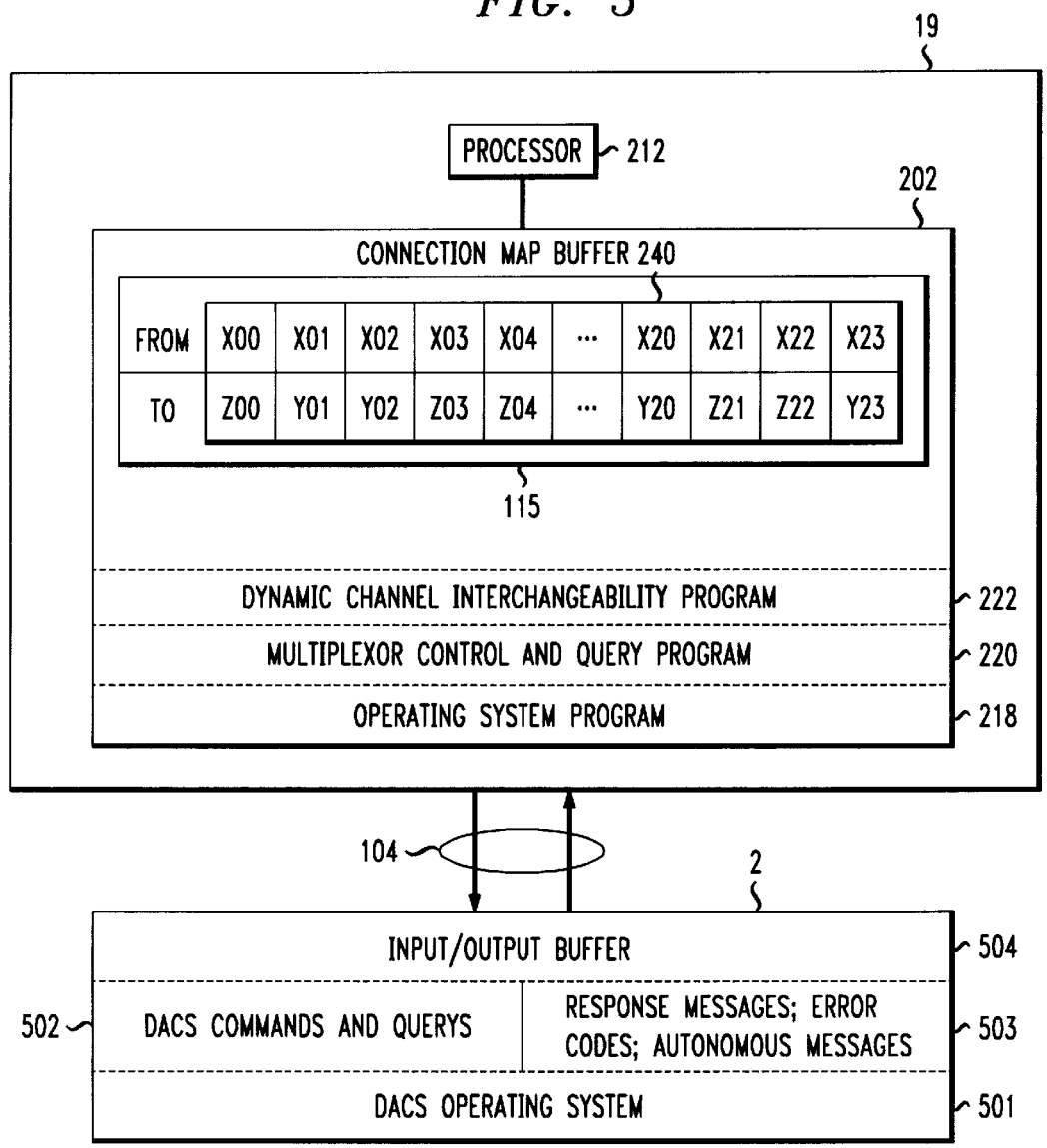

FIG. 6B

| FROM | X00 | X01 | X02 | X03 | X04 | ... | X20 | X21 | X22 | X23 |
|---|---|---|---|---|---|---|---|---|---|---|
| TO | Z00 | Z01 | Y02 | Z03 | Z04 | ... | Y20 | Z21 | Z22 | Y23 |

FIG. 6C

| D00 | V01 | V02 | D03 | D04 | ... | V20 | D21 | D22 | V23 |
|---|---|---|---|---|---|---|---|---|---|

|←——— T1 FRAME X" ———→|

FIG. 6D

|  |  | V02 |  |  | ... | V20 |  |  | V23 |
|---|---|---|---|---|---|---|---|---|---|

|←——— T1 FRAME Y" ———→|

FIG. 6E

| D00 | D01 |  | D03 | D04 | ... |  | D21 | D22 |  |
|---|---|---|---|---|---|---|---|---|---|

|←——— T1 FRAME Z" ———→|

DYNAMIC INTERCHANGEABILITY OF VOICE AND DATA CHANNELS AND FACILITIES IN SWITCHED MODE NODAL NETWORKS

BACKGROUND OF THE INVENTION

1. Field of the Invention

The present invention relates to the field of telecommunications. More particularly, the present invention relates to a method and a system for dynamically reconfiguring digital voice access channels in a switched-mode nodal network to become digital data access channels.

2. Description of the Related Art

A typical business telecommunications network customer uses various combinations of telecommunications services including, for example, switched voice and data, packet, frame relay, Bandwidth-on-Demand (BoD), and private line services. Connection to the various services is usually through a digital circuit, commonly referred to as a T-1 (alternatively, a T-1.5 or DS-1) access circuit or facility, that can carry 24 voice and/or data channels simultaneously. A single channel of the access facility, referred to as a DS-0 channel, uses a bandwidth of 64 kbps. The term channel as used herein, though, is not necessarily limited to be a DS-0 channel, but can be an integral multiple of DS-0 channels. Twenty-four DS-0 channels are combined using a time division multiplexing technique to form a T-1 access facility having a bandwidth of 1.544 Mbps. Since two-way communications is usually desired, a duplex facility is provided that is capable of handling two-way data transmission at a rate of 1.544 Mbps in each direction.

A T-1 access facility originating at a network customer site usually terminates on an electronic cross-connect device of a Carrier Office (CO). For AT&T networks, for example, one particular cross-connect device is known as a Digital Access and Cross-connect System-II (DACS-II, or simply DACS) or a Digital Cross-connect System (DCS). A basic DCS can handle up to 640 T-1 access facilities on 640 T-1 duplex ports, which are also known as Dia-groups (one T-1 facility per T-1 port). A DCS can be accessed and remotely controlled from a central point for providing specific DS-0 connections between a customer access facility and the various network services offered by the Carrier Office. In the AT&T network, for example, DCSs are used for providing connections to intelligent 4ESS™ switching systems for access to circuit-switched services, to 1PSS™ switching systems for access to circuit switched services, to other DCSs for access to private line and Bandwidth-on-Demand type services, and to route facilities to other digital services.

A DCS, operating in conjunction with a network management-type network, has the capability to cross-connect between the customer access circuits and facilities and the connections to network services at the transmission level, that is, at the physical layer of the known Open System Interconnection (OSI) reference model. Application of electronic cross-connecting capability of a DCS within the OSI model is well-known. In one such application, a network provider can use the electronic cross-connect capability of a DCS for routing channels, circuits and/or facilities to different locations. Only those channels, circuits and/or facilities that have a common set of parameters, however, can be cross-connected, provided that the DCS is capable of handling the parameters. Channels, circuits and/or facilities having dissimilar parameters cannot be cross-connected by a DCS.

Within the AT&T network, for example, a customer access to a DCS can be a specified mix of digitized voice channels and digital data channels at DS-0 level for each channel, and is known as an Integrated Network Access. At the DCS, the digitized voice channels are separated from the network customer access facility, then cross-connected and routed to a toll switch, such as a 4ESS™-type switch, in a permanent configuration known as a Static Integrated Network Access (SINA). The digital data channels are cross-connected and routed to the desired network elements or services and are dynamically reconfigurable. That is, a network customer can selectively route particular data channels to any desired location within private line services or to other digital data services offered by, for example, AT&T. For example, the Bandwidth Management System (ABM) offered by AT&T dynamically cross-connects and routes data channels in accordance with a customer's schedule in response to a reconfiguration request received from a network customer management service station.

Prior attempts to successfully use the DCS capability to cross-connect/switch and/or interchange/transfer digitized voice channels of a network customer access facility into digital data channels, or vice versa, in conjunction with switched services have resulted in significant unresolved problems. Consequently, the voice channels routed through a DCS to a toll switch, such as a 4ESS™-type switch, remain cross-connected in a permanent state (SINA).

For example, one existing RINA implementation, disclosed by U.S. Pat. No. 5,661,725 to Buck et al. and incorporated by reference herein, provides trunk-conditioning for reconfigurable T-1 access to nodal services. Nevertheless, unresolved technical issues have been encountered at higher layers of the OSI model of the Buck et al. implementation that have heretofore prevented the implementation of dynamically reconfigurable access channels for voice services. The unresolved technical issues include:

1) The need for extensive manual provisioning and deprovisioning work of Trunk Sub-Group (TSG) parameters at a 4ESS™-type switch, both at the time of contemplated dynamic reconfiguration implementation and at the time of restoration of the original configuration. For security and privacy reasons, a network customer cannot be given access privileges for administering and provisioning parameters on a 4ESS™-type switch of a telecommunications transport provider. Consequently, a network customer must coordinate configuration and reconfiguration scheduling with the network service provider and the 4ESS™ personnel at both the access and egress nodes.

2) Undesirable and/or false alarms are caused by inappropriate trunk conditioning at a 4ESS™-type switch belonging to the network service provider.

3) False billing and billing errors attributed to the network customer or a calling subscriber occur on the channels that are subjected to disconnection and dynamic reconfiguration from a 4ESS™-type switch.

4) The inability of the network customer or a network provider to schedule a dynamic reconfiguration at any given instance.

5) The need for additional equipment installation, including control terminals connected to 4ESS™-type switches at appropriate locations for administering the customer's trunk subgroup parameters, echo cancelers, back-to-back D4 channel banks, etc.

6) The requirement that only the DCSs in the network provider's network having the ability to impose and alter the trunk-conditioning codes 2.5 seconds after issuance of a configuration command can be used (for example, Release 7.0 and later). Information regarding DCS releases that is provided to a network customer is considered by a network provider to be an undesirable requirement.

What is needed is an implementation of reconfigurability in which the disadvantages stated above are avoided and the interchangeability between digitized voice channels and digital data channels by a network customer is dynamically possible without the necessity of manual intervention.

SUMMARY OF THE INVENTION

The present invention provides a dynamic interchangeability between voice and data access channels and facilities in switched-mode nodal networks without causing false billing, false alarms, and the drawbacks stated above. The advantages of the present invention are provided by a method and a system in which a set sequential commands are used for accessing and controlling a DCS. Initially, a command is issued to the DCS for querying the status of the parameters of a selected access channel for ascertaining whether the channel is active (not dormant); is not in an alarm state caused by a fault; has not been taken out of service for service termination due to maintenance or a dispute; and is not a channel that is prohibited from configuration changes such as a control or a test channel. After ascertaining that the selected channel can be reconfigured, a command is issued to the DCS for disconnecting (or breaking) the channel from the nodal switch, such as a 4ESS™-type switch. Once the channel is disconnected at the DCS, all traffic from the 4ESS™-type switch to the DCS, and vice versa, encounters a broken line condition that is similar to an unplugged telephone. Next, the selected access channel that was disconnected at the DCS is groomed to a set of parameters that match the parameters of a desired data channel to which the selected channel is contemplated to be connected to. The desired data channel can either be owned by the network customer or be part of a pool of data services, such as the AT&T Bandwidth on Demand (BoD). Reconfiguration of the access channel is effected by the DCS by cross-connecting the selected channel with the desired data channel. If during the implementation of the reconfiguration sequence, an error is encountered, for example, the DCS appearing to be busy and not receiving commands, the reconfiguration implementation is aborted. Data captured during the reconfiguration is stored in a memory that is used for restoring the access channel to its original state.

The present invention also provides that a channel disconnected from a 4ESS™-type switch at DCS is kept in an open state after a dynamic reconfiguration of an access channel to a data channel, so that the 4ESS™-type switch does not generate false alarms and false billing. When an active voice call, such as a 900 series call, in which a calling party pays for the duration of the call, or an 800 or an 888 call, in which a called party (network customer) pays for the duration of the call, is disconnected, false billing does not occur. However, after disconnecting an access channel from a 4ESS™-type switch, any voice calls made to the network customer will be unanswerable. This condition can be optionally selected by a network customer when the network customer contemplates using voice channels as data channels during low traffic periods on the voice channels or when the network customer does not want to accept any voice calls.

The present invention also provides a method and a system for controlling a dynamic channel reconfiguration of an access facility in which a first access bit stream is connected on a first, or access channel, to a second, or egress, channel. A status associated the first access bit stream is queried. Status information, which includes a configuration map status, is received for the first access bit stream in response to the query. The configuration map status for the first access bit stream is then stored in a first memory area as a configuration map status. A command is received for disconnecting the first access bit stream on the access channel from the egress channel, and the access channel is disconnected from the egress channel. A set of parameters associated with the access channel are then groomed to match a set of parameters associated with a third channel and a set of parameters associated with a second access bit stream on the access channel are transitioned to match the set of parameters associated with the third channel. A command is received for connecting the second access bit stream containing the groomed set of parameters on the access channel to the third channel. A configuration status for the second access bit stream is stored in a second memory area as a new configuration map status. The access channel is then connected to the third channel, and the second access bit stream on the access channel is directed to the third channel. The dynamic reconfiguration implementation is restored by disconnecting the access channel from the third channel, regrooming the parameters associated with the access channel, storing a retrieved configuration map status for the first access bit stream in the second memory area, connecting the access channel to the egress channel, and directing the first access bit stream on the access channel to the egress channel.

The present invention also provides a digital access cross-connection system that includes a multiplexer and a control processor controlled by a customer application on a customer's network management service station. The multiplexer connects a first, or access, channel of a first, or access, facility that is connected to the digital access cross-connection system to a second, or egress, channel of a second access facility that is connected to the digital access cross-connection system. The access channel is connected to the egress channel in accordance with a first connection map that includes information about a first access bit stream on the access channel and the connection of the access channel to the egress channel.

BRIEF DESCRIPTION OF THE DRAWING

The present invention is illustrated by way of example and not limitation in the accompanying figures in which like reference numerals indicate similar elements and in which:

FIG. 3B shows an exemplary cross-connection map for the initial configuration of the telecommunications system of FIG. 1;

FIGS. 3C–3E respectively show exemplary T-1 frames corresponding to the initial configuration of the telecommunications system of FIG. 1 at respectively different points in the system;

FIG. 4F shows the relationship of FIGS. 4A–4E;

FIG. 5 shows details of the operational relationship between a network customer management service station and a digital cross-connect system according to the present invention;

FIG. 6B shows an exemplary cross-connection map for the exemplary intermediate reconfiguration of the telecommunications system of FIG. 1;

FIGS. 6C–6E respectively show exemplary T-1 frames corresponding to the exemplary intermediate reconfiguration state of the telecommunications system of FIG. 1 at respectively different points in the system;

DETAILED DESCRIPTION

The present invention allows a telecommunications network customer to dynamically reconfigure a digitized voice access channel or circuit, which is initially connected to a switched voice service, to become a digital data channel or circuit that is directed to a data network service, such as a private line data service. Additionally, the present invention permits dynamic restoration of the initial configuration of the voice channel, thus providing the network customer with the ability to select a desired mix of digitized voice channels and digital data channels at any particular time.

Figure 1:
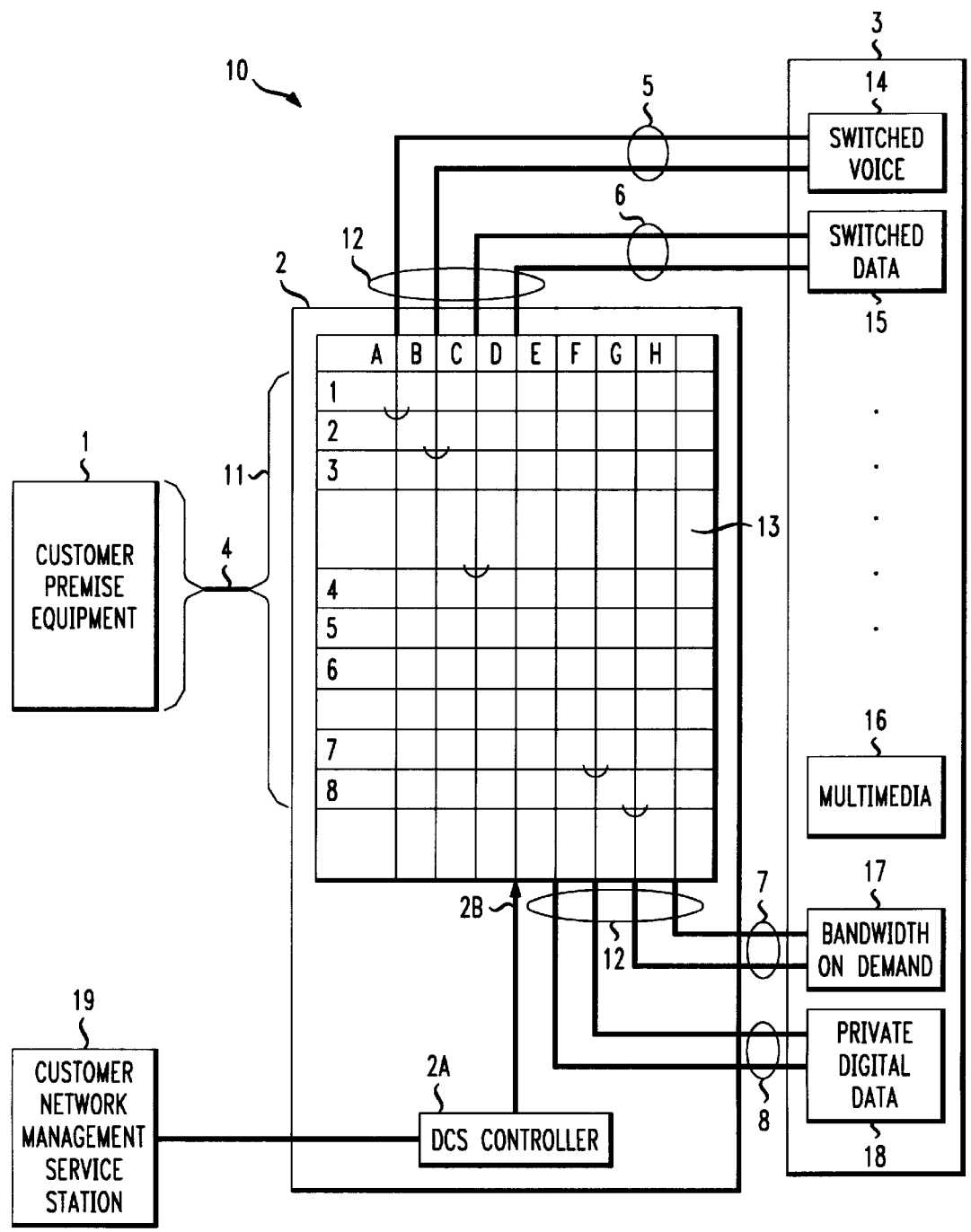
FIG. 1 is a schematic block diagram of a telecommunications system providing dynamic reconfiguration of digitized voice access channels to data channels according to the present invention in a first exemplary cross-connection configuration.

FIG. 1 is a schematic block diagram of a telecommunications system 10 providing dynamic reconfiguration of digitized voice access channels to become data channels according to the present invention. Connections between a Customer Premises Equipment (CPE) 1, also referred to as a customer network element, and network elements and services 3 provided by a telecommunications transport network are effected by connections through a Digital Cross-Connect System (DCS) 2. DCS 2 has a dynamic access channel reconfiguration capability in accordance with the present invention. In that regard, DCS 2 has a two-state trunk-conditioning capability on a voice channel at least in a direction toward a 4ESS™-type switch when the voice channel is disconnected from the 4ESS™-type switch. The first trunk-conditioning capability state is for DCS 2 to disconnect (or break) an on-going call or channel and send a first trunk-conditioning (TC) code toward the 4ESS™-type switch for 2.5 seconds after the disconnect. The second trunk-conditioning capability state is for DCS 2 to send a second TC code toward the 4ESS™-type switch on the disconnected voice channel 2.5 seconds after the first trunk-conditioning code is sent. When the voice channel is subsequently reconnected at the DCS, an intelligent switch, such as a 4ESS™-type switch, has the capability to automatically resume the voice channel service without manual intervention.

In FIG. 1, CPE 1, such as a private branch exchange (PBX), is shown connected to T-1 access ports 11 of DCS 2 over a customer T-1 access facility 4. The DS-0 circuits of customer T-1 access facility 4 are connected through cross-connects 13 to T-1 egress ports 12 of DCS 2. From egress ports 12, the network customer DS-0 circuits are connected to equipment 3 of the telecommunications transport service provider, such as equipment providing switched voice/data services 14 and 15, multimedia services 16, Bandwidth on Demand (BoD) 17 and private digital data services 18. The access channels of access facility 4 typically are a combination of digitized voice channels and/or data channels, however, all access channels can be digitized voice channels.

DCS cross-connects 13 are controlled by a DCS controller 2A that includes an application process through which requests for changes in customer access configuration are received through an administrative/control port 2B, interpreted and implemented within DCS 2. DCS controller 2A stores customer service data and formulates DCS commands for effecting configuration changes by disconnecting and re-connecting cross-connects 13 between T-1 ports 11 and 12. Configuration changes are made by reconfiguring associated channel groups on the access facility. A channel group, as used herein, is an end-to-end connection entity that traverses one or more DCS in series and can have a bandwidth of one or more DS-0s. The binary sequences for the TC codes used by the present invention for each voice channel signaling type or application are stored in and are used by DCS controller 2A. DCS controller 2A, pursuant to a command from management service station 19 applies an appropriate TC code, via DCS 2, to each disconnected DS-0 voice channel of a T-1 facility 11 based on the signaling type indicated by a network customer.

Figure 2:
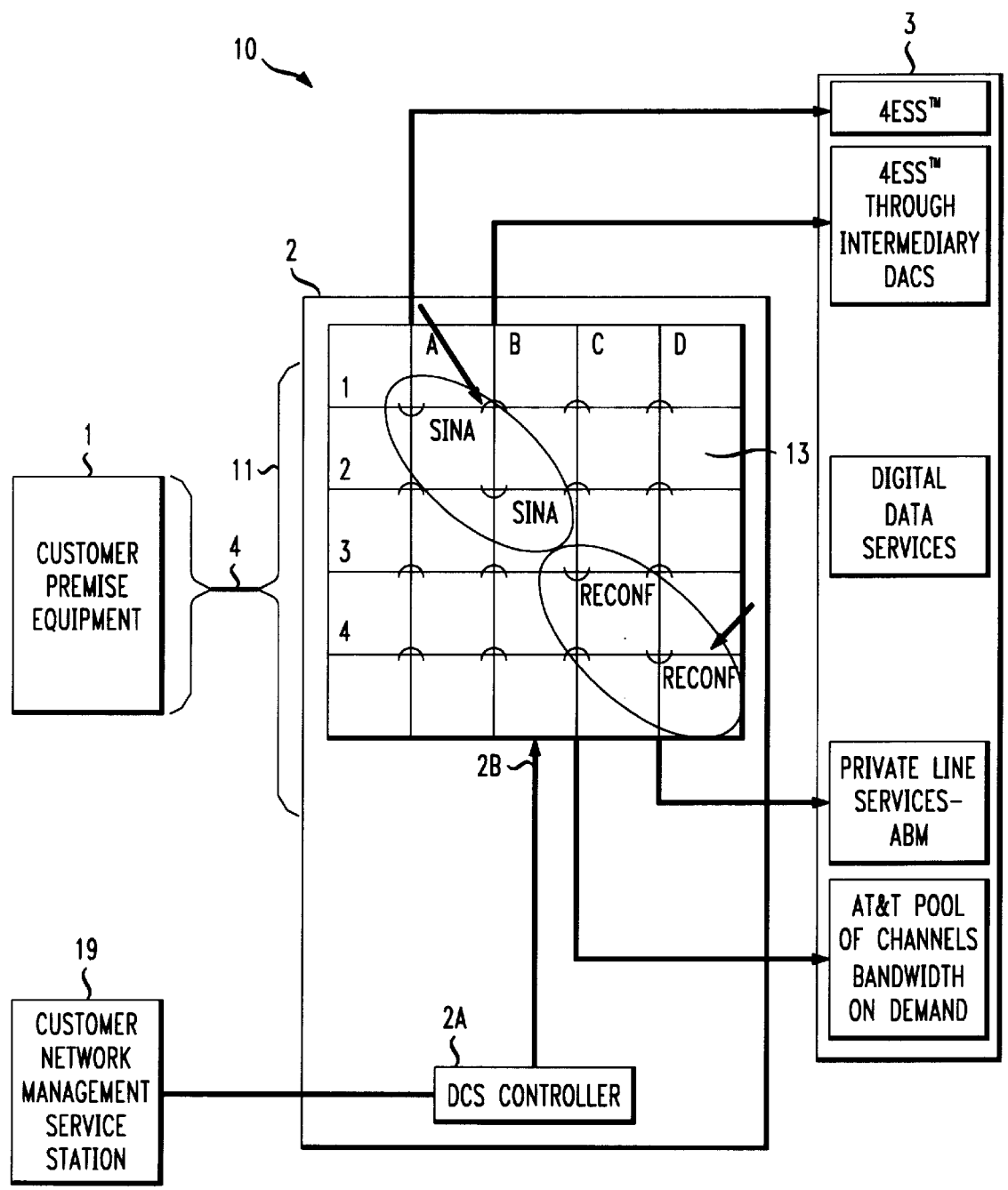
FIG. 2 is a schematic block diagram of the telecommunications system shown in FIG. 1 in a second exemplary cross-connection configuration.

While only one access port 11 is shown in FIG. 1, configuration changes can be made between DS-0 channels on a selected input T-1 port 11 and another selected output T-1 port 12, or between DS-0 channels on a selected input T-1 port 11 and a plurality of selected T-1 ports 12. For example, DCS 2 is shown in a first exemplary cross-connection configuration in FIG. 1. DCS 2 is shown in a second exemplary cross-connection configuration in FIG. 2. In both FIGS. 1 and 2, cross-connections 13 that are effected, or connected, are shown having a ∪ shape at a connection intersection. In FIG. 2, cross-connections 13 that are not effected, or disconnected, are shown as having a ∩ shape at a connection intersection. Even though FIGS. 1 and 2 each show a single DCS 2 utilizing the present invention, multiple DCSs can be used that each provide a dynamic access channel reconfiguration capability according to the present invention.

A customer can request an immediate change of a particular configuration of an access facility from a network customer management service station 19 that is used for performing access reconfigurations on either an on-demand or on a scheduled basis. Network customer management service station 19 can be located at, for example, a customer's site, forming part of CPE 1, as shown in FIG. 1. Desired configuration changes are communicated directly to DCS controller 2A in a well-known manner from management service station 19, which can be embodied as a PC or a workstation. Alternatively, management service station 19 can be located in an operations center of the service provider where contracted services and access reconfigurations are performed for network customers on either an on-demand or a scheduled basis. For example, management service station 19 can be part of a bandwidth management center (not shown), such as ACCUNET® Bandwidth Manager (ABM) platform, such as that provided by AT&T. Additional management service stations can be located in an operations center (not shown) for providing dynamic reconfiguration support for other network customers.

FIGS. 3, 6 and 7 are diagrams showing configuration details of telecommunications system 10 at different stages of a dynamic access channel reconfiguration implementation according to the present invention. FIGS. 4A–4E show a flow diagram of a process providing a dynamic access channel reconfiguration implementation according to the present invention. Table 1 shows exemplary commands and messages that are used by a DCS during a dynamic access channel reconfiguration implementation. Specific syntax for the commands depends on whether DCS 2 is Hierarchical, Nonhierarchical, 640, Capacity Expansion Frame (CEF), etc.

query program 220, a dynamic channel interchangeability program 222, and a connection map buffer 240. Operating system program 218 includes operating kernel instructions that are executable by processor 212 in a well-known manner. Multiplexer control program 220 includes program instructions that are executable by processor 212 in a well-known manner for controlling multiplexer 110 of DCS 2. Dynamic channel interchangeability program 222 includes program instructions that are executable by processor 212 in a well-known manner for generating commands for performing the process shown in FIGS. 4A–4E. Connection map buffer 240 stores an initial connection map during a dynamic access channel reconfiguration implementation for subsequent restoration at the end of the dynamic reconfiguration implementation. Processor 212 is configured for generating communication sequence signals in a well-known manner, such as an X.25 protocol signal or a Snider protocol signal, that are transmitted over line 104. DCS 2 functionally includes a DCS operating system 501, a DCS command and query interpreter 502, a table 503 for response messages, error codes and autonomous messages, and an input/output buffer 504.

Initially, multiplexer 110 (FIG. 3A) cross-connects digitized voice channels and digital data channels on customer access facility X to T-1 access facility Y and to T-1 access

TABLE 1

Command DCS COMMANDS

| | RECONFIGURATION |
|---|---|
| 1 | UTIL:FRM 08,SEQ 29:QRY, TO 13403004! PF |
| R | TCON:: . . . FROM NPC (X).ch(Xx), TO NPC (Y).ch(Yy), tc<0011,0011>,TRB |
| 2 | TDIS:: . . . FROM NPC (X).ch(Xx), TO NPC (Y).ch(Yy),INCLUDE |
| 3 | TCON:: . . . FROM NPC (Y).ch(Yy), TO NPC (Y).ch(Yy), tc<0000,0000>,TRB |
| 4 | TCON:: . . . FROM NPC (X).ch(Xx), TO NPC (Z)ch(Zz), tc<0011,0011>,TRB |
| | RESTORATION |
| 5 | TDIS:: . . . FROM NPC (Y).ch(Yy), TO NPC (Y).ch(Yy),INCL |
| 6 | TDIS:: . . . FROM NPC (X).ch(Xx), TO NPC (Z).ch(Zz),INCL |
| 7 | TCON:: . . . FROM NPC(X),ch(Xx), TO NPC (Y).ch(Yy), tc<0011,0011 >,TRB |

Figure 3A:
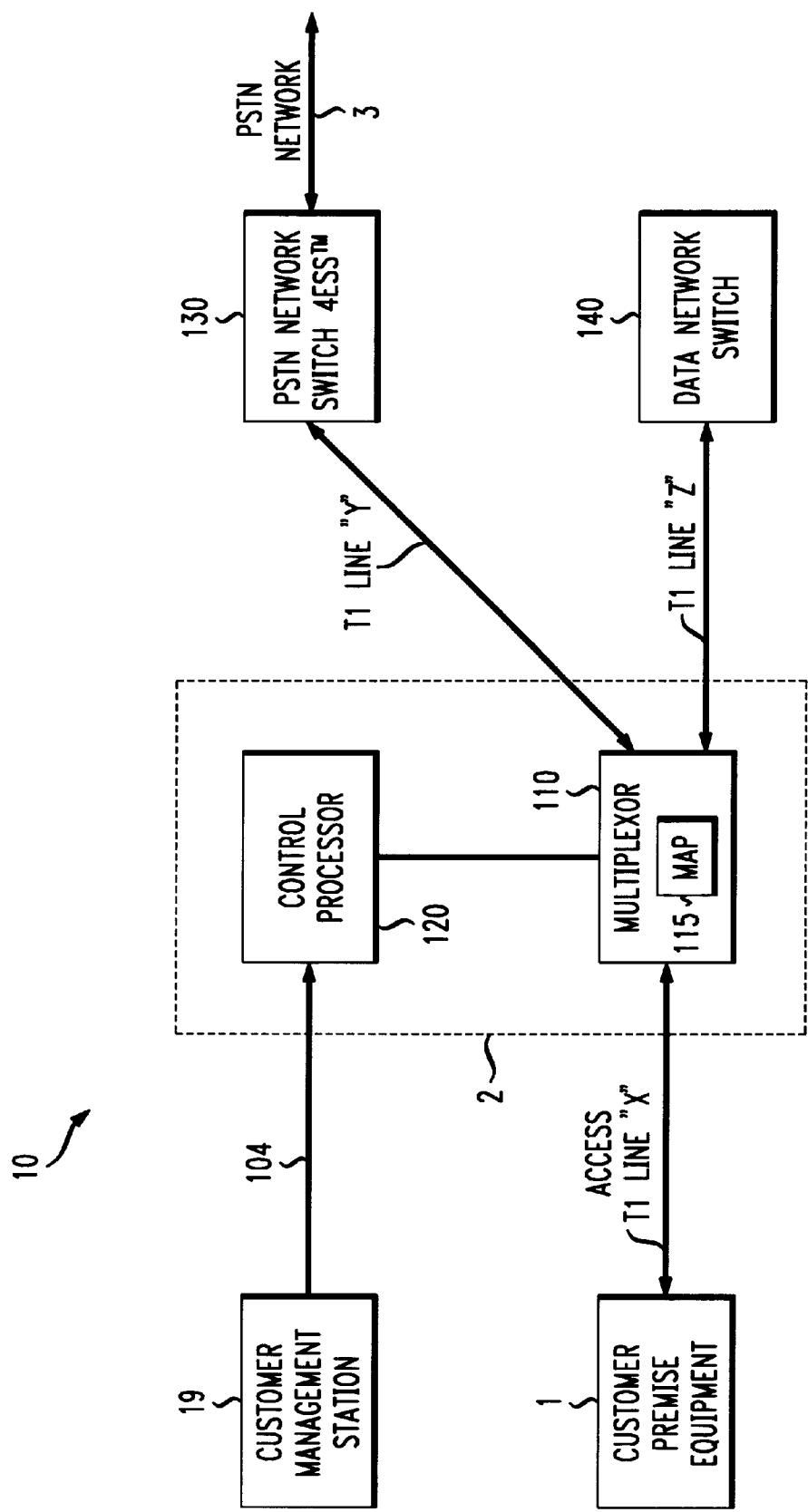
FIG. 3A is a schematic block diagram showing details of an initial configuration of the telecommunications system of FIG. 1 for a dynamic reconfiguration implementation according to the present invention.
Figure 4A:
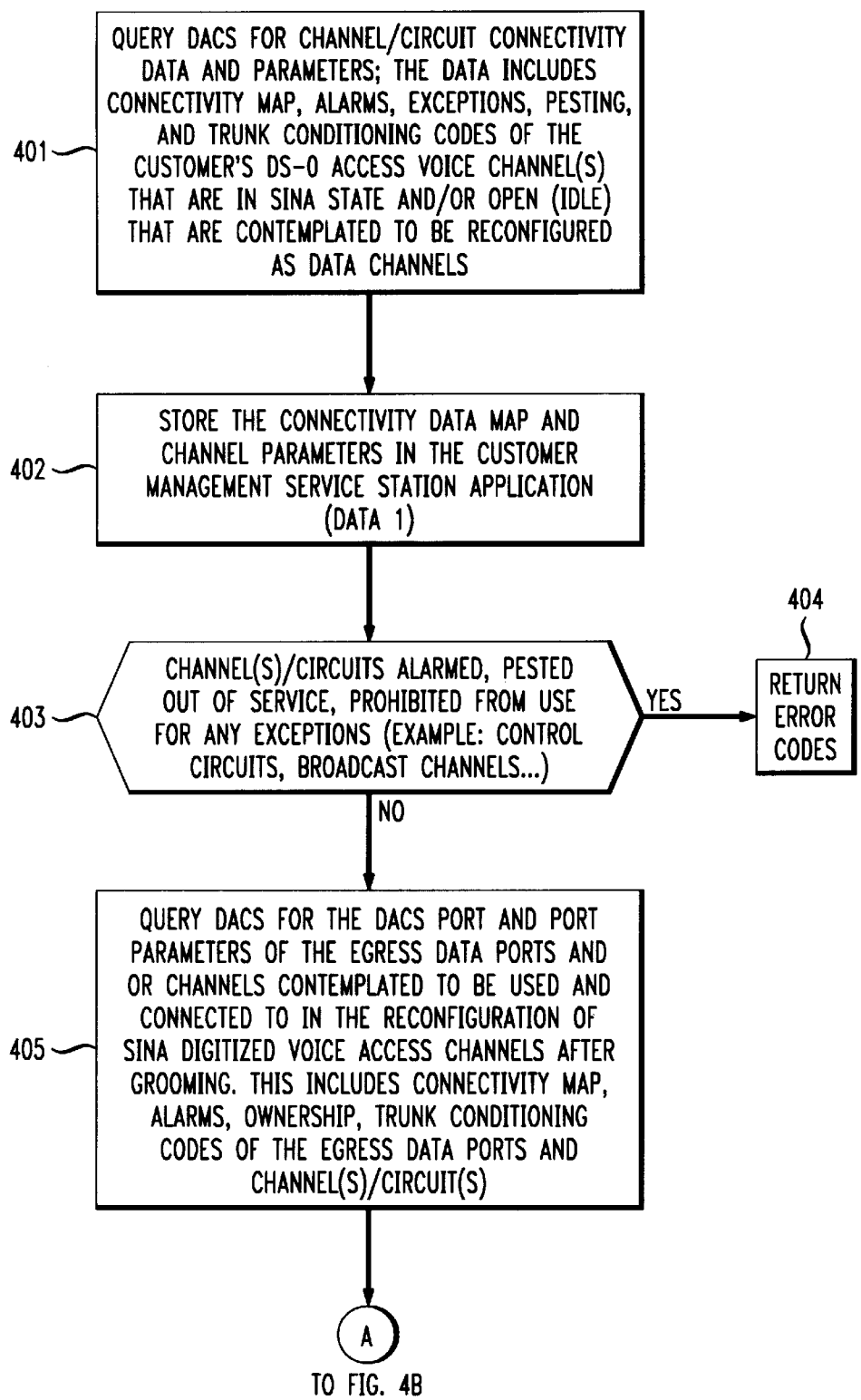
FIGS. 4A–4E show a flow diagram of a process providing a dynamic reconfiguration implementation according to the present invention.
Figure 4B:
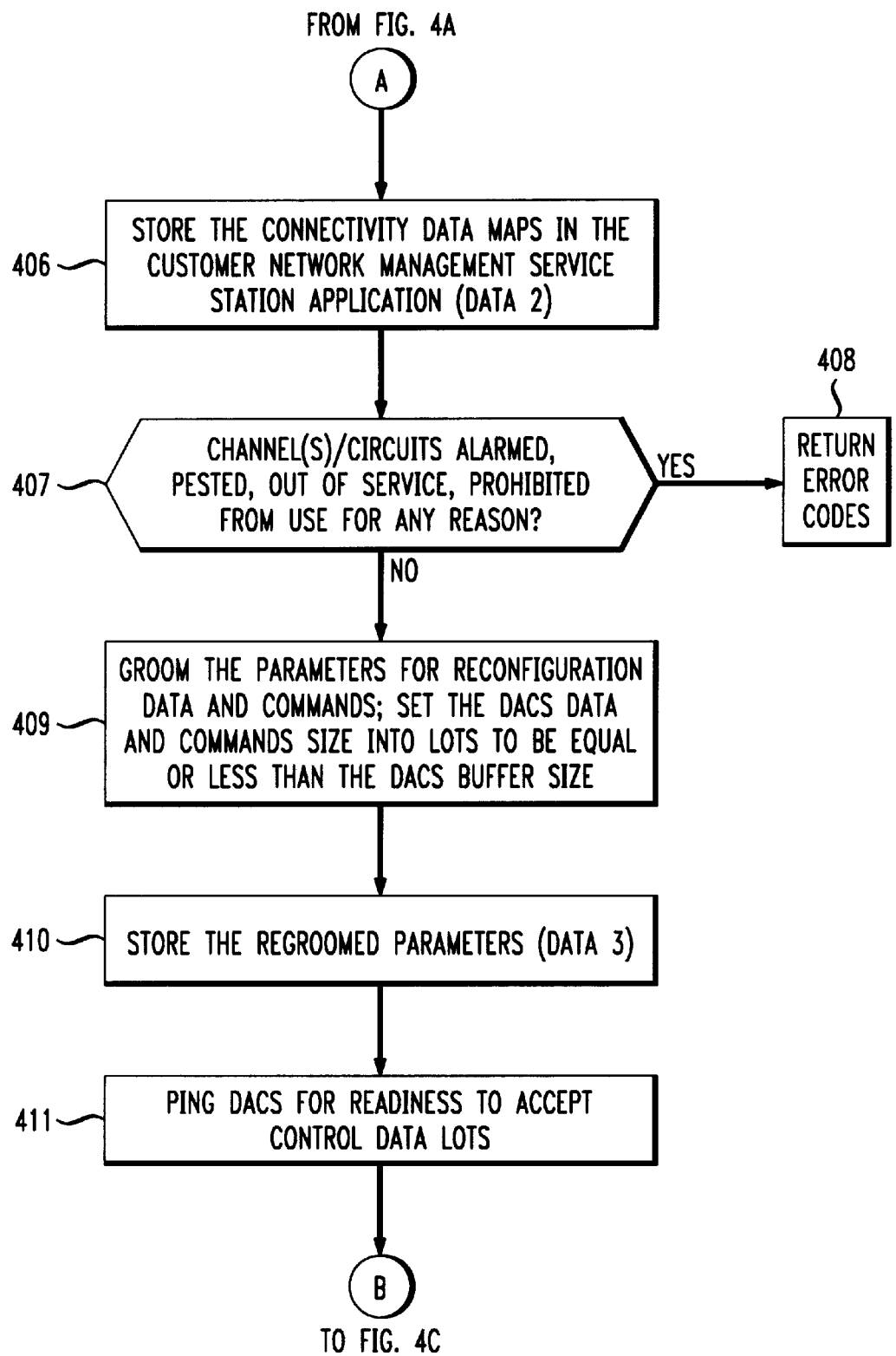
Figure 4C:
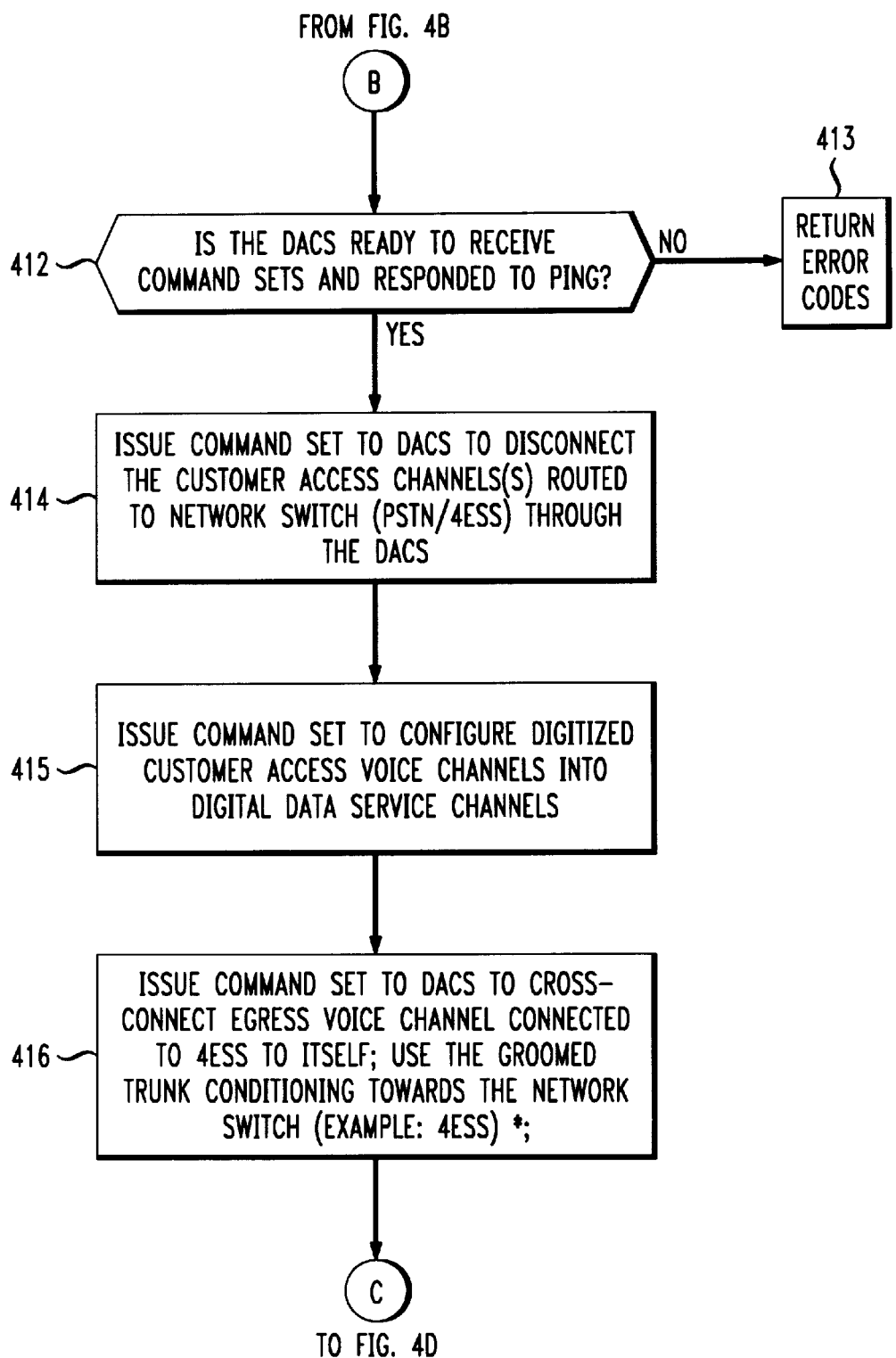
Figure 4D:
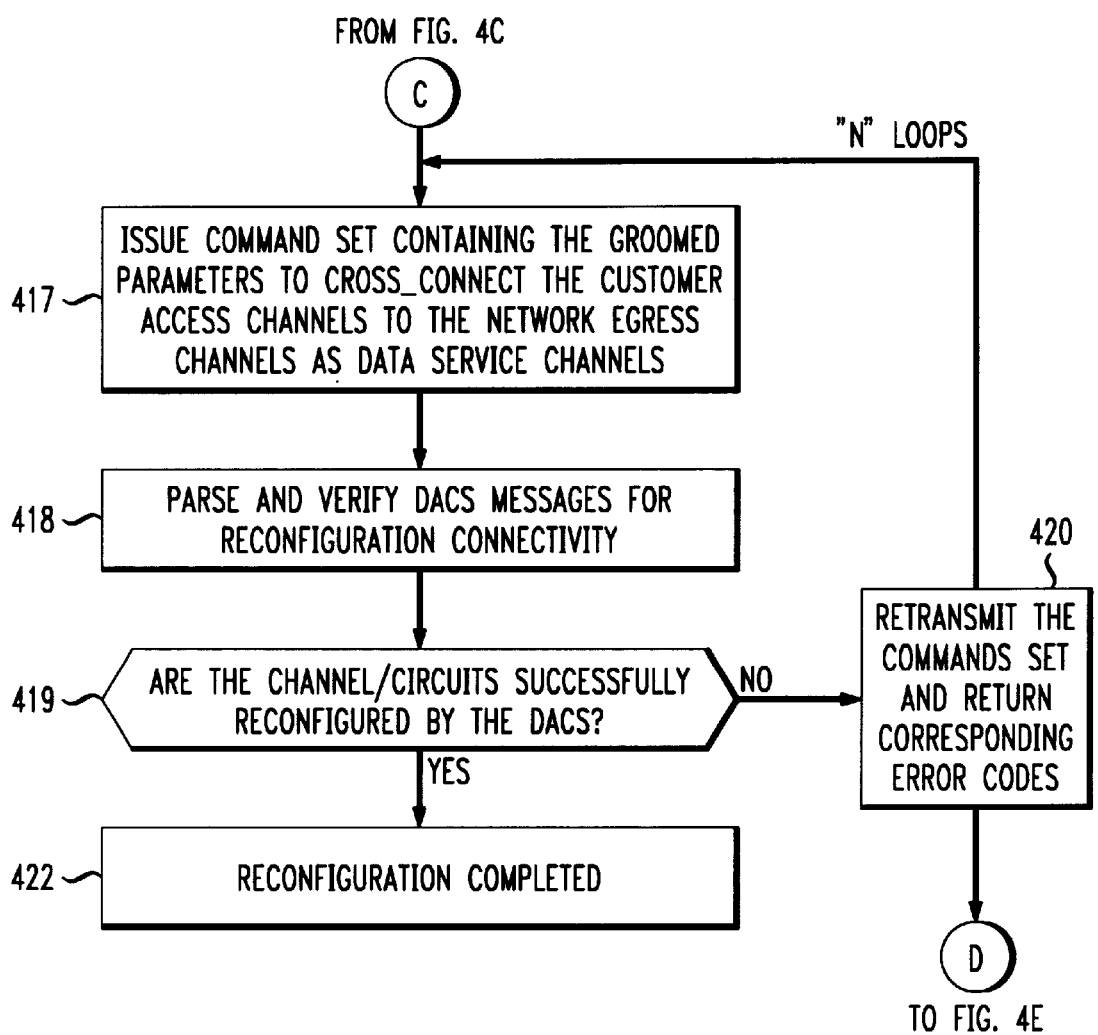
Figure 4E:
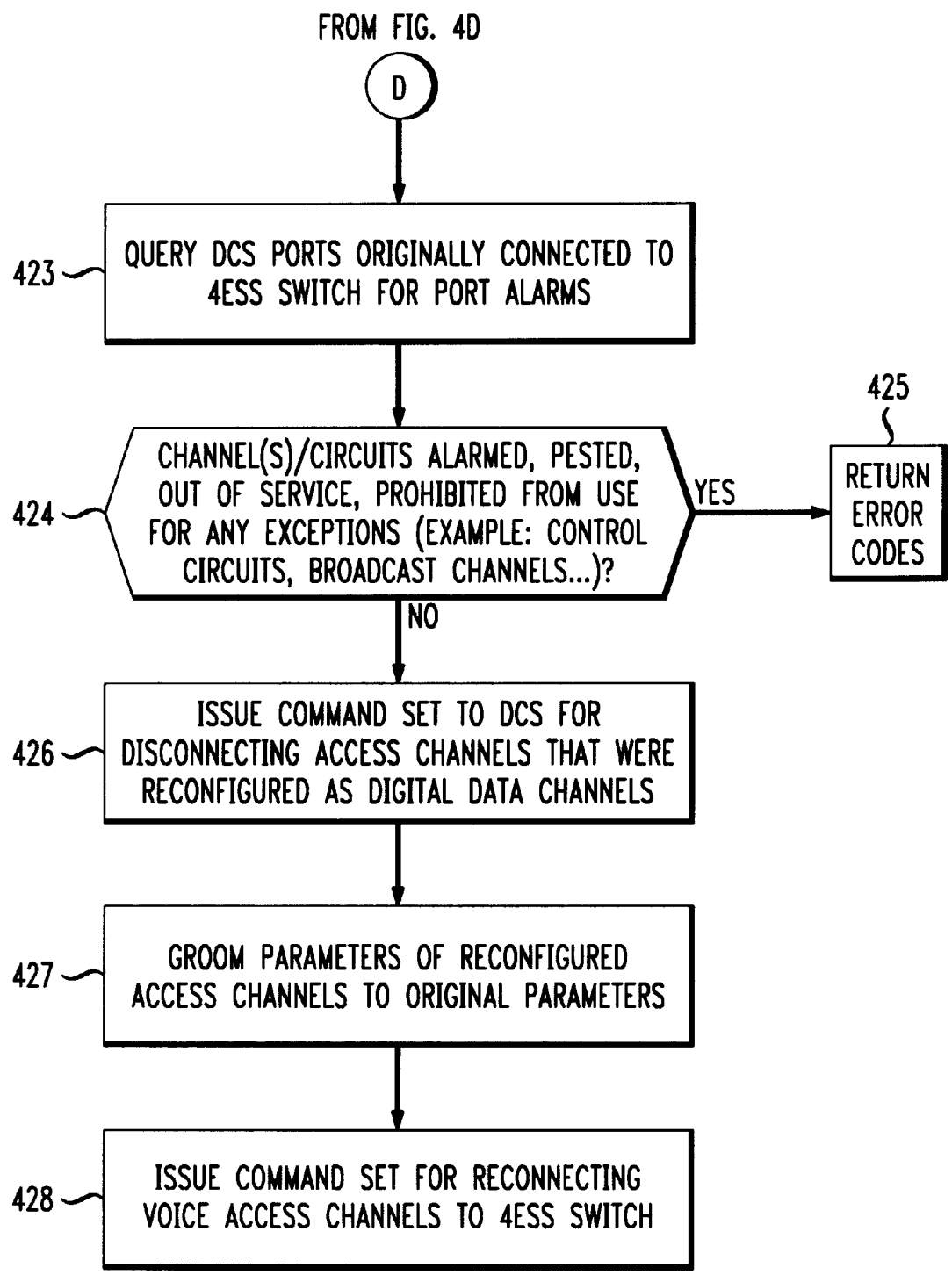

FIG. 3A shows details of an initial configuration of telecommunications system 10. In FIG. 3A, network customer CPE 1 is connected to DCS 2 via a customer T-1 access facility X. The network customer may own T-1 access facility X or lease it from the service provider. DCS 2 includes a control processor 120 that is part of DCS controller 2A and which receives commands from a network customer management service station 19 (FIGS. 1, 2 and 5) over line 104 for controlling a multiplexer 110. Line 104 can be, for example, an X.25 or a Snider protocol communication link. FIG. 5 shows details of the operational relationship between network customer management service station 19 and DCS 2 according to the present invention.

In FIG. 3A, DCS 2 is shown connected to a 4ESS™-type switch 130 of a public switched telephone network (PSTN) network via a T-1 access line Y and to a data network switch 140 via a T-1 access line Z. Typically, the network transport company owns data network switch 140. While FIG. 3A (and FIGS. 6A and 7A) show T-1 access line Z as a single hop, there may be several hops before customer data is transported to a customer egress point.

Network customer management service center 19, as shown in FIG. 5, includes a processor 212 and a memory 202. Memory 202 includes memory space containing an operating system program 218, a multiplexer control and facility Z, respectively, in accordance with a cross-connection map 115, shown in FIG. 3B. FIG. 3C shows an exemplary T-1 frame X', having a representative combination of digitized voice and digital data channels, that is transmitted from CPE 1 to DCS 2 over T-1 access facility X. Robbed-bit signaling is used, as appropriate, on the individual DS-0 channels 00–23 for the 24 channels in a T-1 frame. FIG. 3D shows an exemplary T-1 frame Y' in which digitized voice channels from T-1 frame X' have been cross-connected to T-1 frame Y'. Similarly, FIG. 3E shows an exemplary T-1 frame Z' in which digital data channels from T-1 frame X' have been cross-connected to T-1 frame Z'.

FIGS. 4A–4E show a flow diagram of a process 400 providing a dynamic access channel reconfiguration implementation according to the present invention. At step 401, network customer management service station 19 sends a query to DCS 2, using, for example, a UTL command for obtaining the connectivity map data and channel parameters of the digitized access voice channels on T-1 access line X that are connected to 4ESS™ switch 130 through DCS 2, whether the channels are in a SINA "In Active State" and/or in a SINA "Not In Active State", and that are contemplated to be reconfigured as data channels. The phrase "In Active State", as used herein, means that there is activity from CPE 1 to 4ESS™ switch 130, or from 4ESS™ switch 130 to CPE 1. The phrase "Not In Active State", as used herein, means that there is no activity (idle) from CPE 1 to 4ESS™ switch 130 or from 4ESS™ switch 130 to CPE 1.

The connectivity map data includes information such as:
(1) whether a particular channel has an "In Active State" status or a "Not In Active State" (idle) status;
(2) the FROM to TO connectivity of each channel, that is, the access port and channel number of each circuit connected to 4ESS™ switch 130, along with each corresponding egress port and channel number;
(3) the alarm status of each channel;
(4) any exceptions to using a channel for reconfiguration, such as whether the circuit is a test channel, a broadcast channel, a signaling channel, a channel that is under maintenance, a channel that is dormant, and a channel that is pested, that is, a circuit that is out of service as a result of an alarm condition, maintenance requirements or another cause;
(5) whether a channel is to be kept in a particular state because of a dispute, monitoring performance degradation on the channel or for future use; and
(6) whether a channel not owned by the network customer.

Specific channel parameters include:
(1) the trunk conditioning that is used by a customer network element for signaling to the 4ESS™ or signaling received from the 4ESS™;
(2) whether a channel is an exclusive channel, such as for disaster recovery use; and
(3) broadcast channel and circuit parameters, such as a broadcast from the network customer or a broadcast received from a remote location.

Command 1 in Table 1 shows an exemplary UTL command for querying the status of a network customer's access channels in accordance with step 401. For this particular exemplary query command, DCS 2 responds with the exemplary message: "M 15:38:26 08,29 501 UTL QRY TO 13404004 TYPE DE220 1 LN MSG: 13401004 DE220 TC(0011,0011) TRB COMPL", in which the trunk-condition code is indicated to be TC(0011,0011). The value 13403004 represents an exemplary channel number 004 in an exemplary diagroup 13404 of a Capacity Expansion Frame (CEP) DCS II and is used herein only for purposes of illustrating the present invention. The DCS 2 response to the query indicates that channel 13403004; (FROM) is connected to channel 13401004 (TO) using the TC code TC(0011,0011), which was used when the channel was originally provisioned. This TC code, when generically represented, is TC(ijkl,mnop), where ijkl=0011 and mnop= 0011 for this example. Variable bits (ijkl) define the signaling bits sent by DCS 2 on the FROM facility, and variable bits (mnop) define the signaling bits sent by DCS 2 on the TO facility.

Within the variable bit blocks, variable bits ij and mn are used for the signaling bit state during the first 2.5 seconds after a carrier failure and variable bits kl and op are used for the signaling bit state during the remaining time. Variable bits i, m, k and o are used for the A bit signaling in 4-state signaling. Similarly, variable bits j, n, l and p are used for the B bit signaling in 4-state signaling. The signaling bits (--kl) and (--op), that is, (--11,--11) in this example, are the bits that are used for providing alarms appropriately. Specifically, the (--op) bits from the DCS signal the 4ESS™ switch to the alarm state in a usual operational state. If, however, the 4ESS™ switch is sent a signal by DCS 2 by using a trunk conditioning code having the binary complement of (--kl,--op), the 4ESS™ switch recognizes the trunk condition code as "no alarm".

If at any point during a reconfiguration sequence a failure condition or state occurs, such as when DCS 2 does not return a "COMPL" message indicating successful completion of a command, the present invention reverts back to the initial configuration without completing the dynamic access channel reconfiguration by using Command R in Table 1 for re-establishing the connectivity between the X and Y T-1 access circuits. Error codes are returned indicating particulars of any failures.

At step 402, the connectivity data map and channel parameters extracted with the UTL query command are stored in connection map buffer 240 (DATA 1 in FIG. 4) in the application running at network customer management service station 19 for later restoration of the circuits to their initial condition after the dynamic reconfiguration implementation.

If, at step 403, there are no exceptions, that is, if there are no alarms, channels pested, channels out-of-service, channels prohibited from being used, then flow continues to step 405. Otherwise, error codes are returned at step 404 indicating the specific failures and the reconfiguration is aborted.

At step 405, DCS 2 is queried for the DCS port data and port parameters of the egress data ports and/or channels that are contemplated to be used for connection to the dynamically reconfigured SINA digitized voice channels subsequent to channel grooming. The information returned includes a connectivity map, any alarms, circuit ownership information, trunk conditioning codes used the subject egress data ports and channel(s)/circuit(s).

At step 406, the connectivity data map and channel parameters are stored in the network customer management service station application (DATA 2 in FIG. 4). If there are no exceptions at step 407, flow continues to step 409. Otherwise, error codes are returned at step 408 indicating specific failures and the reconfiguration is aborted. At step 409, the circuit parameters (DATA 2) are groomed for reconfiguration data and commands. Grooming includes formatting and reformatting commands and data, sequencing command and data sets, parsing and extracting relevant logical data and commands. For example, the command and data size is reformatted into a lot size that is equal to or less than the buffer size of DCS 2 so that there is no possibility that DCS 2 can lose the commands and data in an overflow condition when the commands are sent to DCS 2 by network customer management service station 19 during reconfiguration. Grooming also includes calculating an appropriate trunk-conditioning code by, for example, using the binary complement of the trunk-conditioning code returned by the DCS in response to a status query (command 1 of Table 1). At step 410, the groomed parameters are stored (DATA 3 in FIG. 4).

At step 411, DCS 2 is "pinged" for readiness to accept the commands and data lots. As used herein, the term "ping" is used to mean that a command is sent to DCS 2 for determining whether DCS 2 is still operational and has not locked up. If, at step 412, DCS 2 is ready to receive the data and commands by responding to the pinging, flow continues to step 414. Otherwise, error codes are returned at step 413 indicating specific failures and the reconfiguration is aborted. At step 414, command sets (from DATA 3) are issued to DCS 2 for disconnecting the customer access digitized voice channels routed to 4ESS™ through DCS 2, regardless of whether their status is "In Active State" or "Not In Active State". Command 2 in Table 1 shows an exemplary TDIS command for disconnecting diagroups between the X and Y T-1 access facilities. The parameter "INCLUDE" includes both RDC and CUS circuits in the disconnection. An "RDC" parameter includes Red-Lined Circuits that are customer controllable, as indicated by a "CUS" parameter. A TC code for an IDLE condition is sent to the 4ESS™ switch for each reconfigured DS-0 channel. When a voice channel is in an "In Active State" when disconnected, a conversation occurring on the voice channel is disrupted. When a voice channel is "Not In Active State" when disconnected, any future voice calls from 4ESS™ switch 130 to CPE 1 will appear to the caller as being unanswered at CPE 1.

At step 415, command sets containing groomed parameters (DATA 3) are issued to DCS 2 for configuring the customer access digitized voice channels into data service channels. At step 416, a command is issued to DCS 2 for connecting an egress digitized voice channel connected to 4ESS™ switch 130 to itself, and a trunk conditioning code is sent towards 4ESS™ switch 130. If it is desired that 4ESS™ switch 130 does not generate false billing, and/or false alarms, it is important that the appropriate trunk conditioning code signal is generated by DCS 2 and sent towards 4ESS™. Command 3 uses a "groomed" TC (--00,--00), which is the binary complement of TC (--11,--11) meaning that the bit stream signaling is "no alarm" signaling. Stated generally, if a query/response TC of a channel is (ijkl,mnop), command 3 of Table 1 uses a calculated TC (ijk'l',mno'p'), where bits k', l', o' and p' are each binary complements of bits k, l, o and p, respectively.

Command 2 of Table 1 is issued to DCS 2 at time TA (shown in FIG. 8B) and command 3 of Table 1 is issued to DCS 2 any time after command 2 is issued, which the TC code containing the binary complement of the original TC code for the channel. This command tears down the channel, that is, disconnects the channel, and at the same time the 4ESS™ switch recognizes that the channel is inactive. The 4ESS switch "drops off" the channel/circuit without false alarm and/or false billing. After time TF (FIG. 8B), calls from the 4ESS™ switch to DCS 2 will not be answered even though the calling party receives a ring back tone. It is not necessary to take into account the type of trunk a customer premises equipment (CPE) uses when tearing down a channel because command 3 of Table 1 contains the TC code having the binary complement of the TC from the DCS 2 query/response result. Once the voice channels from the customer premises equipment to the 4ESS™ switch are torn down by DCS 2 without impacting the operation of the 4ESS™ switch and/or billing, the access channels are free to be utilized as data channels after further grooming. Additionally, it is not necessary to take into account the type of signaling used by the customer premises equipment and the corresponding provisioning in the TSG of the 4ESS™ switch. The bit stream containing the AB signaling bits that originally were used to indicate an alarm to the 4ESS™ switch is modified to be a bit stream having the alarm condition signaled to the 4ESS™ switch as "no alarm".

Figure 6A:
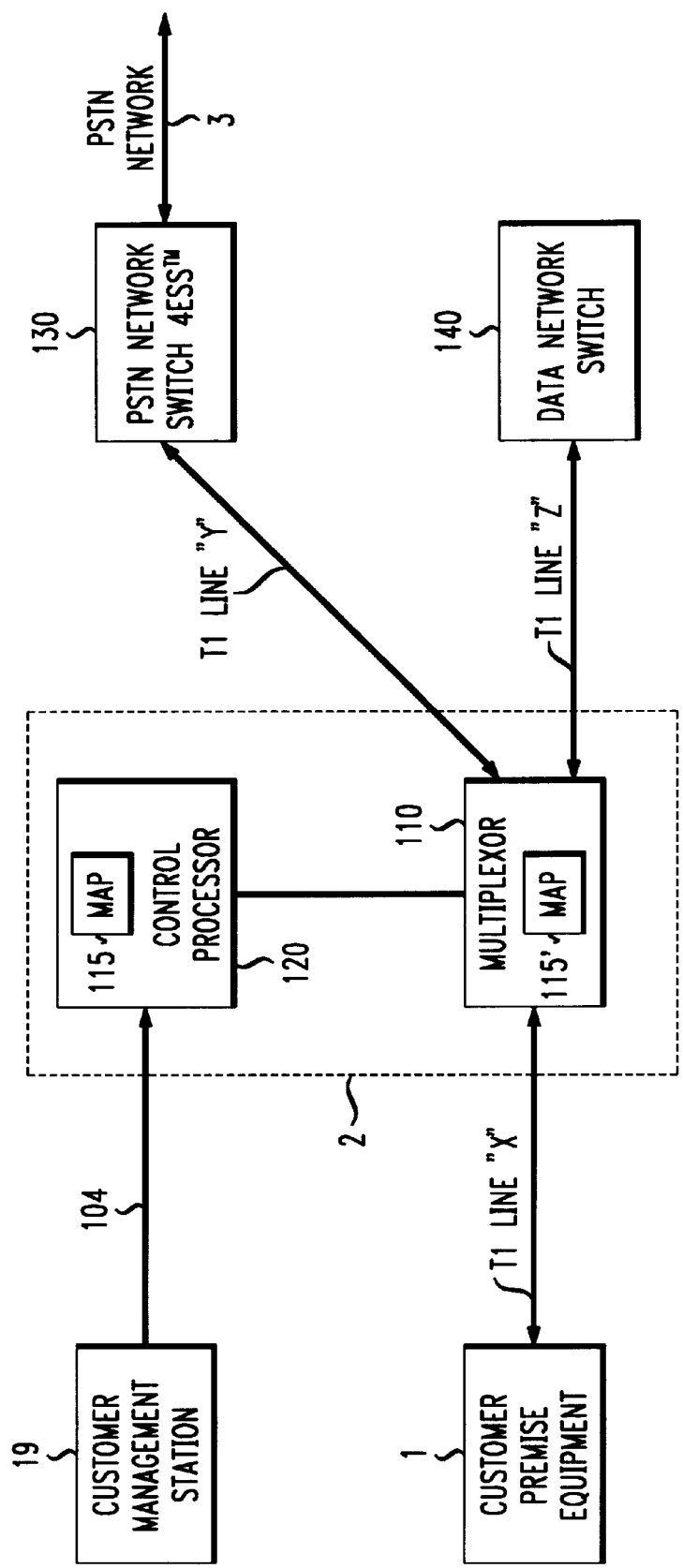
FIG. 6A is a schematic block diagram showing details of an exemplary intermediate reconfiguration state of the telecommunications system of FIG. 1 for a dynamic reconfiguration implementation according to the present invention.

At step 417, the command set containing the groomed parameters is issued to DCS 2 for cross-connecting the network customer access channels as data service channels to the network egress channels. Command 4 in Table 1 shows an exemplary TCON command for establishing connectivity between the X and Z T-1 access facilities. FIG. 6A is a schematic block diagram showing details of an exemplary intermediate reconfiguration state of the telecommunications system. The initial cross-connection map shown in FIG. 3B is restored in connection map buffer 240. FIGS. 6B–6D respectively show exemplary T-1 frames corresponding to the reconfiguration of the telecommunications system.

At step 418, messages received from DCS 2 are parsed and verified for determining whether the reconfiguration connectivity was successful. If, at step 419, the channels are successfully configured, flow continues to step 422 where the reconfiguration is completed. Otherwise, flow continues to step 420 where the commands are retransmitted to DCS 2 for channels that failed to reconfigure. Steps 417 through 420 are repeated a predetermined number of times N before error codes are returned and the channels are restored to their original state.

When the reconfigured channels are no longer needed, the DCS ports originally connected to 4ESS™ switch 130 are queried at step 423 for determining whether any port alarms exist. If port alarms exist at step 424, flow continues to step 425 where the error codes are returned. If no port alarms exist, flow continues to step 426 where a command is sent to DCS 2 for disconnecting the access channels that were reconfigured to become digital data channels. At step 427, each access channel that is to reconfigured back to its initial condition is groomed to have a set of parameters that match the parameters of a digitized voice channel connected to 4ESS™ switch 130.

Figure 7A:
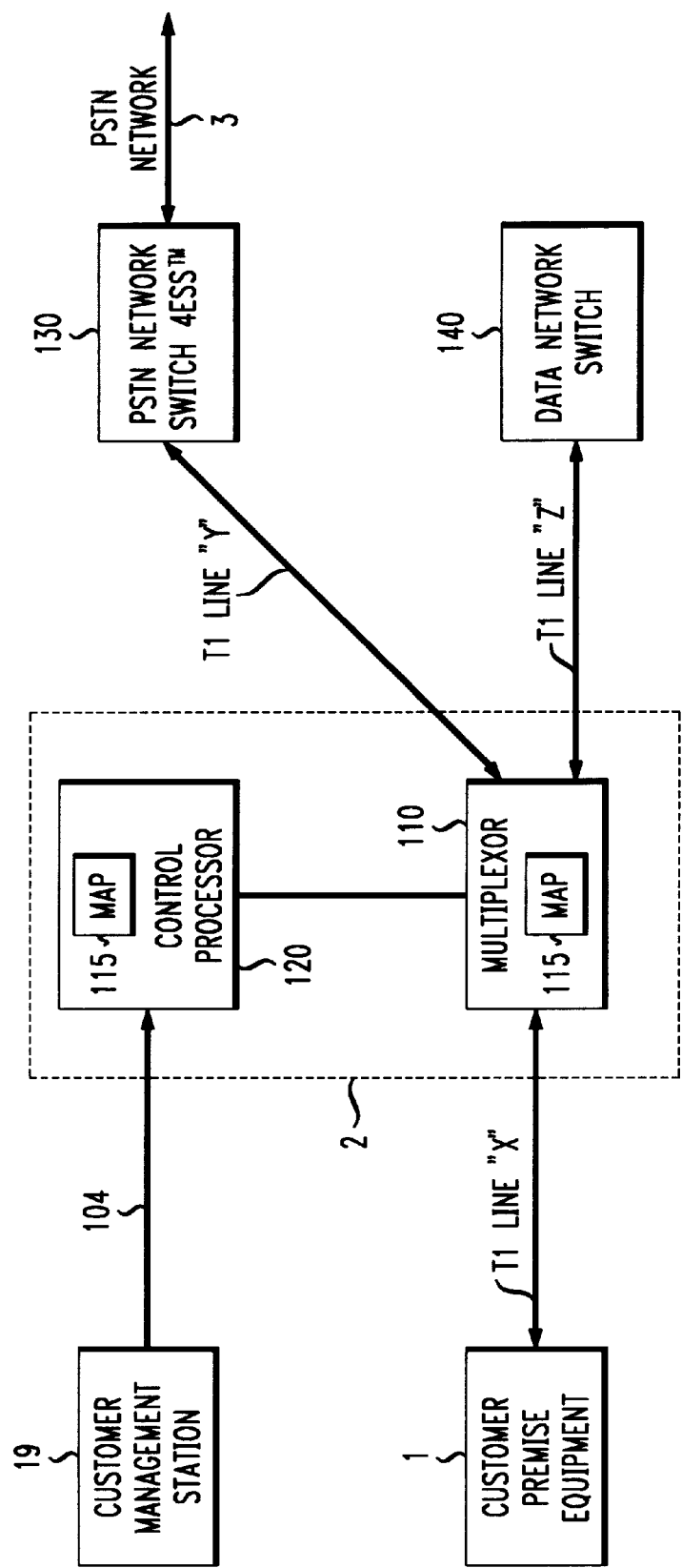
FIG. 7A is a schematic block diagram showing details of the restored initial configuration of the telecommunications system of FIG. 1 for a dynamic reconfiguration implementation according to the present invention.
Figure 7B:
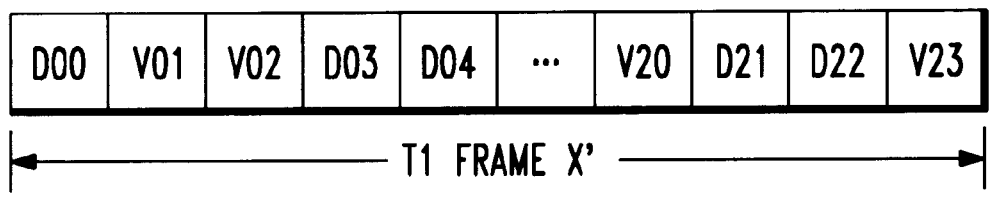
FIGS. 7B–7D respectively show exemplary T-1 frames corresponding to the restored initial configuration of the telecommunications system of FIG. 1 at respectively different points in the system.
Figure 7C:
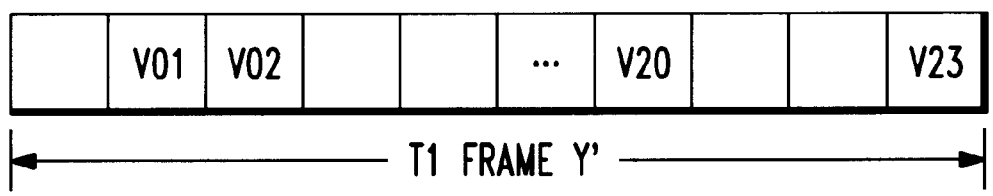
Figure 7D:
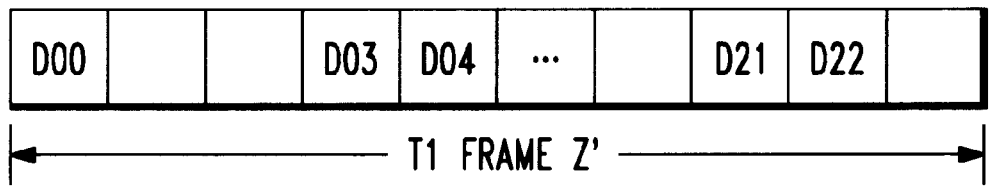

At step 428, a command is sent to DCS 2 for cross-connecting the voice channels to 4ESS™ switch 130. In response, the original cross-connection map is restored in multiplexer 110, restoring the original configuration of the voice channels. Commands 5–7 in Table 1 are exemplary commands that are used for restoring the initial configuration of the telecommunications system. FIG. 7A is a schematic block diagram showing details of the restoration of the initial configuration of the telecommunications system. The original cross-connection map 115 shown in FIG. 3B is restored into multiplexer 110. FIGS. 7B–7D respectively show exemplary T-1 frames corresponding to the restored initial configuration of the telecommunications system.

In data applications, trunk-conditioning (TC) codes are used for sending certain designated bits in the bit stream when the channel is experiencing a problem or trouble with transmission of the data bits. In (digitized) voice applications, trunk conditioning codes are used for similarly signaling a problem or trouble with transmission of voice data bits, in addition to being used for signaling operating conditions, such as off-hook, on-hook, ringing. The trunk-conditioning bits in the bit stream, referred to as ABCD, ABAB, AB bits, have fixed positions in the bit stream depending upon the type of format used for the transmission. For example, in a D4 format, also known as a Super Frame Format, there are 12 consecutive frames. In "Robbed bit" signaling (A/B signaling) in the Super Frame Format, bit 8 of every channel is overwritten by the A bit during the sixth frame of each super frame, and bit 8 is overwritten by the B bit during the 12th frame, thus providing A/B signaling. This particular signaling is also called a four state signaling corresponding to 00, 01, 10, 11 of the AB bits. In an Extended Super Frame (ESF) format, which can provide four-state signaling containing ABCD bits, the A bit is inserted as bit 8 into the 6th frame, the B bit is inserted as bit 8 into the 12th frame, the C bit is inserted as bit 8 into the 18th frame, and the D bit is inserted as bit 8 into the 24th frame, thus providing 16-state signaling corresponding to 0000 through 1111 as values assigned to ABCD. If two-state signaling is used in the ESF format, the corresponding signaling bits are ABAB in the place of the ABCD signaling bits. That is, the CD signaling bits of the ESF format are replaced by AB signaling bits.

A preferred format for TC codes for A/B robbed-bit type signaling services is "(FROM_codes, TO_codes),IW". FROM_codes are the TC code signaling provided by DCS 2 on the cross-connected channels from DCS 2 toward the customer premise equipment (CPE 1 in FIG. 1). TO_codes are the TC code signaling provided by DCS 2 on the cross-connected channels towards the switched-voice services (network elements and services 3 in FIG. 1). AB robbed-bits for various signaling types are specified in AT&T PUB 43801, Digital Channel Bank Requirements and Objectives dated November 1982, which is incorporated herein by reference. The "FROM_codes" are TC codes that are entered for the FROM terminal of a DCS, the "TO_ codes" are the codes that are required for the TO terminal of a DCS, and "IW" is an insertion word that, in a preferred embodiment, is a DCS standard trouble code "TRB" (E4 in hexadecimal). The FROM and TO codes are individually formatted as (ijkl, mnop), where "ijkl" and "mnop" are the signals that are applied by the DCS on to the FROM and TO terminals, respectively, that are channels. An example of a TC code entered in this format (0101,0111), TRB.

Signals "ij" and "mn" are IDLE codes that are inserted into a disconnected DS-0 channel for the initial 2.5 seconds after the occurrence of the disconnection. Signals "kl" and "op" are either "IDLE" or "BUSY" codes that take over a disconnected channel after the initial 2.5 seconds and remain as long as the connectivity loss exists, that is, for the duration of the disconnection.

Figure 8A:
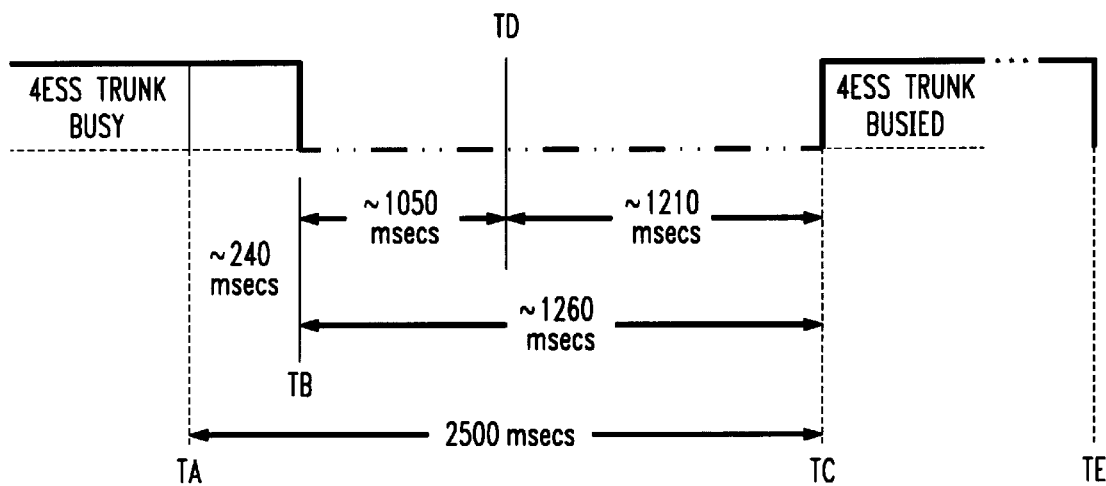
FIG. 8A shows an operational timing diagram for a digitized DS-0 voice channel that is disconnected from a 4ESS™-type toll switch by a DCS using conventional trunk-conditioning (loop, ring)

FIG. 8A shows an operational timing diagram for a digitized DS-0 voice channel that is disconnected from a 4ESS™-type toll switch through a DCS using conventional trunk-conditioning (loop, ring). For FIG. 8A, the 4ESS™-type switch has been provisioned so that the Customer Outgoing Disconnect "CODSC" parameter is Yes "Y", the Type Of Trunk "TOT" parameter is "PBX", and the Trunk Subgroup "TSG" parameter is appropriately set. At time TA, the DCS disconnects the DS-0 channel and sends an idle/inactive TC code (for example, A=0, B=0) to the 4ESS™ switch. After approximately 240 ms, the 4ESS™ switch considers the condition to be a disconnect situation at time TB and receives an on-hook signal from the DCS. The 4ESS™ switch then initiates a guard timing window of approximately 1050 ms for the disconnected DS-0 channel, occurring between time TB and time TD, so that new calls are not allowed to access the channel toward the DCS. For the conventional SINA implementation, at the end of the 2.5-second interval measured between time TA to time TC, the DCS sends a busy/active (for example, A=1 and B=1) TC code toward the 4ESS™ switch at time TC. If there is an active call on the channel from the 4ESS™ switch towards the DCS and the calling party continues to hold on to the channel, the calling party will continue to be billed because the called party is simulated by the DCS signal (by A=1 and B=1) towards the 4ESS™ switch as an "OFF HOOK" condition. While the conversation is cut off, the called party is still active. Under the conventional approach of FIG. 8A, false billing and/or false alarm conditions occur. Such a situation can be expensive for a calling party if the call was a "900" service call. If the call is an "800" or "888" service call, the call can be expensive for the called party.

If the calling party hangs up, the DCS sends a TC code towards the 4ESS™ switch (A=1, B=1) that simulates the condition that the called party is still off-hook beyond time TC, and the 4ESS™ switch labels the trunk as "Looped" (off-hook) and generates a High and Wet alarm condition.

The "Looped" trunk is disconnected by the 4ESS™ switch after a period of 6 to 8 minutes at time TE.

Figure 8B:
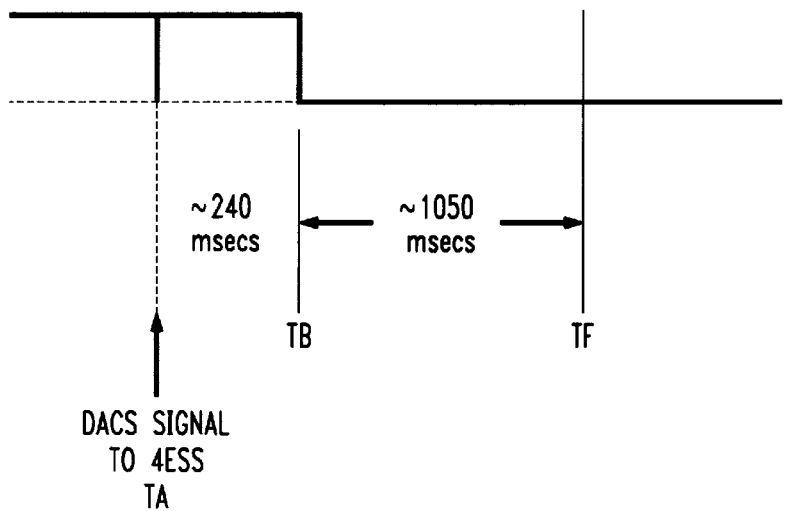
FIG. 8B shows an operational timing diagram according to the present invention for a digitized voice channel that is disconnected from a 4ESS™ switch by a DCS.

FIG. 8B shows an operational timing diagram according to the present invention for a digitized voice channel that is disconnected from a 4ESS™-type switch by DCS 2 (FIGS. 1 and 2). According to the present invention, the DCS sends a "groomed" TC code to the 4ESS™ switch after disconnecting the voice channel/circuit, which may be active, inactive or in a state of transition between active to inactive or vice versa. The "groomed" trunk condition signal (occurring at step 416 in FIG. 4C) is a calculated value based on a sequence of commands sent to and responses received from the DSC, such as the exemplary commands and responses shown in Table 1. The groomed TC code applied by the DCS on the channel from the DCS to the 4ESS™ switch after time TA (FIG. 8B) disconnects and idles the trunk without causing 4ESS™ switch to generate alarms or produce false billing.

Figure 9:
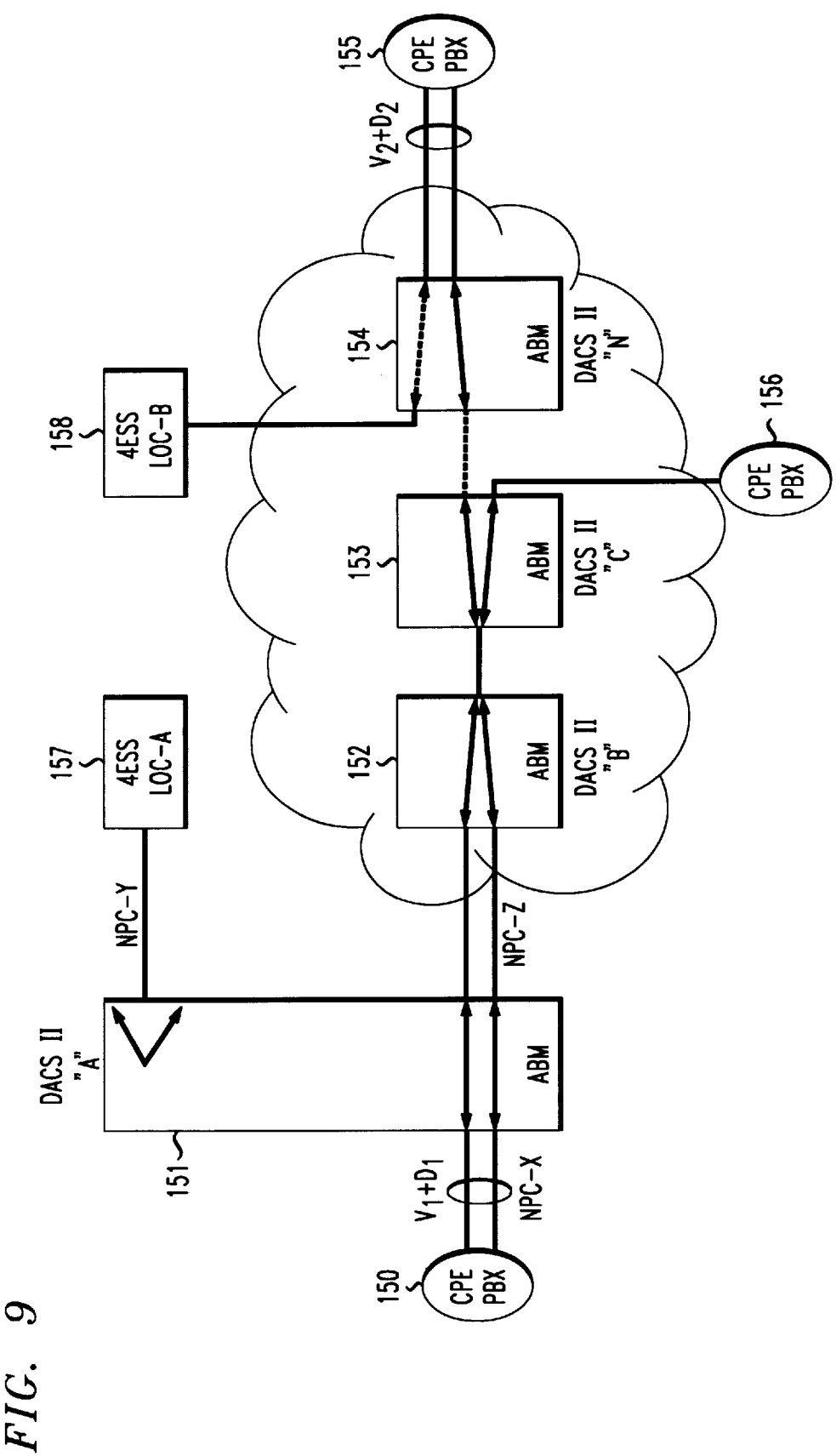
FIG. 9 shows a schematic block diagram of a dynamic reconfiguration implementation on, for example, an ACCUNET® Bandwidth Manager platform offered by AT&T according to the present invention.

FIG. 9 shows a schematic block diagram of a dynamic channel reconfiguration implementation on, for example, an ACCUNET® Bandwidth Manager (ABM) platform offered by AT&T according to the present invention. A network customer CPE PBX 150 at a first location is connected through several DCS to the customer's CPE PBX 155 at a second location. As shown in FIG. 9, selected DS-0 channels of the customer T-1 access facility to DCS 151 are configured as data channels that are directed through DCS 152, DCS 153 and DCS 154 before being connected to CPE PBX 155. DCS 152–154 are part of the ABM platform. CPE PBX 155 can operate as a "substitute" to CPE PBX 150 during a RINA implementation according to the present invention. A voice channel of the customer T-1 access facility to DCS 151 can be reconfigured as a data channel that is ultimately connected to CPE PBX 155. CPE PBX 155 redirects the call through DCS 154 as a voice call to 4ESS™ switch 158. Thus, 4ESS™ switch 158 at the second location can be "extended" and be available for CPE PBX 150 through CPE PBX 155 so that access to 4ESS™ switch 158 is a local in place of long distance toll call from CPE PBX 150.

Enhancements for alternative dynamic channel reconfiguration embodiments according to the present invention can provide a voice message by routing calls dialed to dynamically reconfigured disconnected channels to an intelligent device, such as AT&T's Universal Signaling Converter, that generates a pre-recorded message or provides a pre-determined signaling tone for indicating unavailability of the called line to the caller.

The concepts of the present invention can also be used in implementing Asymmetric Digital Subscriber Lines (ASDL), High Speed Digital Subscriber Lines (HDSL) and the family of Subscriber Services called XDSL.

While the present invention has been described in connection with the illustrated embodiments, it will be appreciated and understood that modifications may be made without departing from the true spirit and scope of the invention.

What is claimed is:

1. A method for controlling a configuration of an access facility, the method comprising the steps of:
   querying a status associated with a first bit stream on a first channel that is connected to a second channel;
   receiving a status information associated with the first bit stream in response to the query, the status information including a configuration map status;
   storing the configuration map status for the first bit stream in a first memory area;
   receiving a command for disconnecting the first bit stream on the first channel from the second channel;

disconnecting the first channel from the second channel;

receiving a command for connecting a second bit stream on the first channel to a third channel;

storing a configuration map status for the second bit stream in a second memory area;

connecting the first channel to the third channel; and directing the second bit stream on the first channel to the third channel.

2. The method according to claim 1, further comprising the step of grooming a set of parameters associated with the first channel to match a set of parameters associated with the third channel after disconnecting the first channel from the second channel.

3. The method according to claim 1, further comprising the steps of:

receiving a command for disconnecting the second bit stream on the first channel from the third channel;

disconnecting the first channel from the third channel;

receiving a command for connecting the first bit stream on the first channel to the second channel;

retrieving the configuration map status for the first bit stream from the first memory area;

storing the retrieved configuration map status for the first bit stream in the second memory area;

connecting the first channel to the second channel; and directing the first bit stream on the first channel to the second channel.

4. The method according to claim 3, further comprising the step of grooming a set of parameters associated with the first channel to match a set of parameters associated the second channel after disconnecting the first channel from the third channel.

5. The method according to claim 3, wherein the first channel is part of a first access facility, the second channel is part of a second access facility, and the third channel is part of a third access facility, the second and third access facilities each being different from the first access facility.

6. The method according to claim 5, wherein each of the first, second and third access facilities is a duplex facility.

7. The method according to claim 6, wherein the second access facility is physically the same as the third access facility.

8. The method according to claim 6, wherein the second access facility is physically different from the third access facility.

9. The method according to claim 6, wherein the first bit stream is a voice communications signal, and the second bit stream is a data communications signal.

10. The method according to claim 9, wherein the data communications signal is one of a private line application signal, a packet switching application signal, a frame relay application signal and a bandwidth-on-demand application signal.

11. The method according to claim 6, wherein the step of disconnecting the first channel from the second channel includes the step of sending a groomed trunk-conditioning code to the second channel.

12. The method according to claim 11, wherein the first trunk-conditioning code is based on the status information associated with the first bit stream.

13. The method according to claim 12, wherein the status information associated with the first bit stream includes a trunk-conditioning code, and wherein the groomed trunk-conditioning code is a binary complement of the trunk-coding code contained in the status information associated with the first bit stream.

14. The method according to claim 6, wherein the first bit stream is a voice communications application signal uses a robbed-bit signaling technique.

15. The method according to claim 14, wherein the step of disconnecting the first channel from the second channel includes the steps of:

sending a first trunk-conditioning code to the second channel for a first predetermined period of time; and sending a second trunk-conditioning code to the second channel for a second predetermined period of time, the second predetermined period of time being subsequent to the first predetermined period of time.

16. The method according to claim 15, wherein the first trunk-conditioning code is an IDLE code, and the second trunk-conditioning code is based on the status information associated with the first bit stream.

17. The method according to claim 16, wherein the status information associated with the first bit stream contains a trunk-conditioning code, and wherein the second trunk-conditioning code is a binary complement of the trunk-conditioning code contained in the status information associated with the first bit stream.

18. The method according to claim 17, wherein the first predetermined period of time is about 2.5 seconds, and the second predetermined period of time is from the end of the first predetermined period of time to the step of connecting the first channel to the second channel.

19. A digital access cross-connection system, comprising:

a multiplexer connecting a first channel of a first access facility connected to the digital access cross-connection system to a second channel of a second access facility connected to the digital access cross-connection system, the multiplexer connecting the first channel to the second channel in accordance with a connection map; and a control processor having a connection map buffer, the control processor storing a first predetermined connection map received from the multiplexer in the connection map buffer in response to a status query sent to the multiplexer by the control processor and sending a second predetermined connection map to the multiplexer, the first predetermined connection map including information relating to a first bit stream on the first channel and connected to the second channel, and the second predetermined connection map including information relating to a second bit stream on the first channel to a third channel of a third access facility connected to the digital access cross-connection system.

20. The system according to claim 19, wherein the control processor grooms a set of parameters associated with the first channel to match a set of parameters associated with the third channel before sending the second predetermined connection map to the multiplexer.

21. The system according to claim 19, wherein the control processor retrieves the first predetermined connection map from the connection map buffer and sends the first predetermined connection map to the multiplexer for restoring a connection of the first bit stream on the first channel to the second channel.

22. The system according to claim 21, wherein the control processor grooms a set of parameters associated with the first channel to match a set of parameters associated the second channel before sending the first predetermined connection map to the multiplexer for restoring the connection of the first bit stream on the first channel to the second channel.

23. The system according to claim 21, wherein the first channel is part of a first access facility, the second channel is part of a second access facility, and the third channel is part of a third access facility, the second and third access facilities each being different from the first access facility.

24. The system according to claim 23, wherein each of the first, second and third access facilities is a duplex facility.

25. The system, according to claim 24, wherein the second access facility is physically the same as the third access facility.

26. The system according to claim 24, wherein the second access facility is physically different from the third access facility.

27. The system according to claim 24, wherein the first bit stream is a voice communications signal, and the second bit stream is a data communications signal.

28. The system according to claim 27, wherein the data communications signal is one of a private line application signal, a packet switching application signal, a frame relay application signal and a bandwidth-on-demand application signal.

29. The system according to claim 24, wherein when the control processor sends the second predetermined connection map to the multiplexer, the control processor further sends a groomed trunk-conditioning code to the second channel.

30. The system according to claim 29, wherein the groomed trunk-conditioning code is based on the information relating to the first bit stream included in the first predetermined connection map.

31. The system according to claim 30, wherein the information relating to the first bit stream included in the first predetermined connection map includes a trunk-conditioning code, and wherein the groomed trunk-conditioning code is a binary complement of the trunk-conditioning code included in the information relating to the first bit stream.

32. The system according to claim 24, wherein the first bit stream is a voice communications application signal uses a robbed-bit signaling technique.

33. The system according to claim 32, wherein communications signal is one of Ear & Mouth signaling, Loop Send signaling, Ground Send signaling and Private Line Automatic Ringdown signaling.

34. The system according to claim 32, wherein when the control processor sends the second connection map to the multiplexer, the control processor further sends a first trunk-conditioning code to the second channel for a first predetermined period of time, and sends a second trunk-conditioning code to the second channel for a second predetermined period of time.

35. The system according to claim 34, wherein the first trunk-conditioning code is an IDLE code, and the second trunk-conditioning code is based on the information relating to the first bit stream included in the first predetermined connection map.

36. The system according to claim 35, wherein the information relating to the first bit stream included in the first predetermined connection map includes a trunk-conditioning code, and wherein the second trunk-conditioning code is a binary complement of the trunk-conditioning code included in the information relating to the first bit stream.

37. The system according to claim 36, wherein the first predetermined period of time is about 2.5 seconds, and the second predetermined period of time is from the end of the first predetermined period of time to when the control processor sends the first predetermined connection map to the multiplexer.

* * * * *